United States Patent [19]

Taniguchi et al.

[11] Patent Number: 4,527,878

[45] Date of Patent: Jul. 9, 1985

[54] METHOD AND APPARATUS FOR CONTROLLING ACTIVITY OF DEVELOPING SOLUTION AGAINST OXIDATION BY USING A TEST PIECE

[75] Inventors: Hiroshi Taniguchi, Uji; Nobuhiro Takita; Norimasa Nomura, both of Kyoto; Masaji Mizuta, Uji, all of Japan

[73] Assignee: Dainippon Screen Seizo Kabushiki Kaisha, Kyoto, Japan

[21] Appl. No.: 395,699

[22] Filed: Jul. 6, 1982

[30] Foreign Application Priority Data

Jul. 20, 1981 [JP] Japan ............................... 56-113219
May 24, 1982 [JP] Japan ............................... 57-87593

[51] Int. Cl.³ ...................... G03D 13/00; G01N 21/59

[52] U.S. Cl. ................................ 354/298; 354/324; 356/443; 430/30

[58] Field of Search .................. 354/298, 324; 430/30; 356/443, 444

[56] References Cited

U.S. PATENT DOCUMENTS 1,895,760 1/1933 Hunt ................................... 354/298
3,636,851 1/1972 Furst .................................. 354/298
3,995,959 12/1976 Shaber ............................... 356/443
4,293,211 10/1981 Kaufmann ........................... 354/298
4,365,895 12/1982 Shaber ................................ 356/444

*Primary Examiner*—A. A. Mathews
*Attorney, Agent, or Firm*—Yuter, Rosen & Dainow

[57] ABSTRACT

A method and apparatus for controlling the activity of a developing solution against oxidation by using a test piece for use in an automatic developer. Differences $N_4-N_4'$ and $N_5-N_5'$ between first and second standard densities $N_4$ and $N_5$ measured at first and second points of a first test piece developed in a standard developing solution and first and second densities $N_4'$ and $N_5'$ measured at the same points of a second test piece of the same type as the first one as the same points of the first test piece, developed in a developing solution to be controlled, are obtained. An operating time T of constant-flow supplementing means is calculated according to a formula $T=K_1[K_3(N_4-N_4')-(N_5-N_5')]+K_2$ wherein $K_1$, $K_2$ and $K_3$ are first, second and third predetermined oxidation factors, and then the constant-flow supplementing means is actuated for the obtained operating time T, thereby supplementing a supplementary solution to the developing solution to be controlled in order to restore its activity. A permissible density range may be determined, in which no activity control is performed.

7 Claims, 3 Drawing Figures

METHOD AND APPARATUS FOR CONTROLLING ACTIVITY OF DEVELOPING SOLUTION AGAINST OXIDATION BY USING A TEST PIECE

BACKGROUND OF THE INVENTION

The present invention relates to a method and apparatus for controlling activity of developing solution against oxidation by using a test piece for use in an automatic developer.

In a conventional automatic photographic film developer, the activity of the developing solution which is fatigued or lowered by the film blackening, has been maintained at the proper value in some methods as follows:

(a) The replenishment of a supplementary solution against the blackening is carried out depending on a developed area of the photographic film and a predetermined blackening rate.

(b) The supplementary solution is supplemented depending on a blackened area measured on the photographic film.

(c) The supplementary solution is replenished in a certain period of time corresponding to the measured length of the photographic film to be processed, whose predetermined unit length requires the supplement of a certain volume of the supplementary solution.

The developing solution is also fatigued by oxidation by means of the air, and the like. The degree of the oxidation of the developing solution is different between during and in the absence of the operation of the automatic developer. Hence, in general, the amount of the supplementary solution per unit period of time should be varied during and in the absence of the operation of the developer.

However, while such an activity control of the developing solution is continued, the control errors are accumulated. Accordingly, the activity of the developing solution must be further controlled, for example, twice a day by using a test piece.

In a conventional activity control method of the developing solution against the oxidation, the test pieces exposed with predetermined light and shade and are processed in the standard developing solution and the developing solution whose activity is to be controlled, separately. Then the densities at the predetermined light and shade points of the developed test piece processed in the developing solution to be controlled are compared with those of the test piece processed in the standard developing solution, with the naked eye or a densitometer. Then, depending on the difference of these densities, the supplementary solution is added to the developing solution to be controlled on the basis of the operator's experiences and skill, in order to restore the activity of the developing solution.

In this method, however, the determination of the exact amount of the supplementary solution corresponding to the density difference of the two test pieces is very difficult. Accordingly, in practice, the supplementary solution is usually added in a somewhat smaller amount in a manual manner, and then the activity of the developing solution is measured by using the test piece. Then, the supplementary solution is added to the developing solution depending on the measured result, thereby obtaining a proper activity. However, this operation is very troublesome and involves a lot of time.

SUMMARY OF THE PRESENT INVENTION

It is an object of the present invention to provide a method for controlling the activity of a developing solution against oxidation by using a test piece for use in an automatic developer, free from the aforementioned inconveniences and disadvantages, which is simple, quick and reliable, and need not any skill.

It is further object of the present invention to provide an apparatus for controlling the activity of a developing solution against oxidation by using a test piece for use in an automatic developer, free from the aforementioned inconveniences and disadvantages, which is capable of performing a simple, quick and reliable operation without any skill.

According to the present invention a method is provided for controlling the activity of a developing solution against oxidation by using a test piece for use in an automatic developer, comprising the steps of (a) obtaining differences $N_4-N_4'$ and $N_5-N_5'$ between first and second standard densities $N_4$ and $N_5$ measured at the predetermined first and second points of the first test piece which is developed in a standard developing solution, and densities $N_4'$ and $N_5'$ measured on the second test piece of the same type as the first test piece and is developed in a developing solution to be controlled, the measuring points on the second test piece corresponding to the respective measuring points of the first test piece, (b) calculating an operating time T of constant-flow supplementing means which supplements a supplementary solution to the developing solution to be controlled, according to a formula $T=K_1[K_3(N_4-N_4')-(N_5-N_5')]+K_2$ wherein $K_1$, $K_2$ and $K_3$ are first, the second and third predetermined oxidation factors, and (c) actuating the constant-flow supplementing means for the thus obtained operating time T, thereby supplementing the supplementary solution to the developing solution to be controlled in order to restore its activity.

According to the present invention there is also provided an apparatus for controlling the activity of a developing solution against oxidation by using a test piece for use in an automatic developer, comprising (a) first and second standard density setup means for setting standard densities $N_4$ and $N_5$ that were measured at first and second points of the first test piece which was developed in a standard developing solution, (b) first and second measured density setup means for setting measured densities $N_4'$ and $N_5'$ measured at corresponding points of the second test piece of the same type as the first test piece as said first and second points of the first test piece, which was developed in a developing solution to be controlled, (c) first, second and third factor setup means for setting first, second and third oxidation factors $K_1$, $K_2$ and $K_3$, respectively, satisfying a formula $T=K_1[K_3(N_4-N_4')-(N_5-N_5')]+K_2$ wherein T is an operating time of constant-flow supplementing means for adding a supplementary solution to the developing solution to be controlled in order to restore the lowered activity to the predetermined value, (d) a first subtracter connected to receive the densities $N_4$ and $N_4'$ from the first standard density setup means and the first measured density setup means and calculate a density difference $N_4-N_4'$, (e) a second subtracter connected to receive the densities $N_5$ and $N_5'$ from the second standard density setup means and the second measured density setup means and calculate a density difference $N_5-N_5'$, (f) a density comparator connected to compare the two density differences $N_4-N_4'$ and $N_5-N_5'$ sent from the first and the second subtracters to discriminate the magnitude and output a positive or negative signal depending on the magnitude, (g) a first multiplier connected to receive the density difference $N_4-N_4'$ of the first subtracter and the third oxidation factor $K_3$ set up in the third factor setup means and calculate $K_3(N_4-N_4')$, (h) a third subtracter connected to receive the density difference $N_5-N_5'$ of the second subtracter and the calculation result $K_3(N_4-N_4')$ of the first multiplier and calculate $K_3(N_4-N_4')-(N_5-N_5')$, (i) a second gate which opens only when it receives the negative signals from the density comparator and the first multiplier, (j) a second multiplier driven by the signal output from the second gate and connected to receive the calculation result $K_3(N_4-N_4')-(N_5-N_5')$ of the third subtracter and the first oxidation factor $K_1$ set up in the first factor setup means and calculate $K_1[K_3(N_4-N_4')-(N_5-N_5')]$, (k) an adder connected to receive the calculation result $K_1[K_3(N_4-N_4')-(N_5-N_5')]$ of the second multiplier and the second oxidation factor $K_2$ set up in the second factor setup means and calculate the operating time $T=K_1[K_3(N_4-N_4')-(N_5-N_5')]+K_2$, and (m) constant-flow supplementing means for adding the supplementary solution to the developing solution to be controlled for the operating time T according to the output of the adder.

BRIEF DESCRIPTION OF DRAWINGS

In order that the present invention may be better understood, preferred embodiments thereof will be described with reference to the accompanying drawings, in which.

DESCRIPTION OF THE PREFERRED EMBODIMENTS

Figure 1:
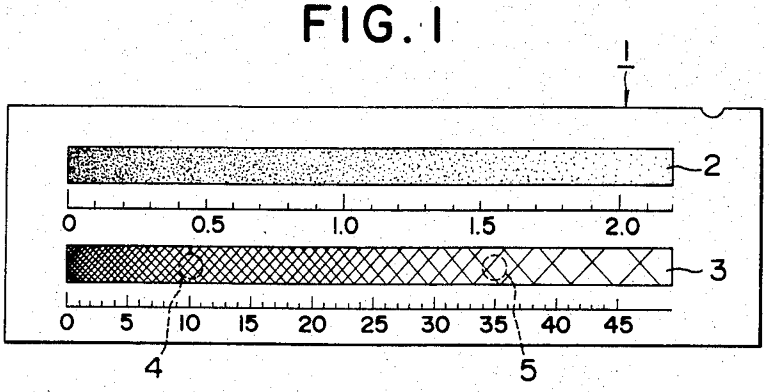
FIG. 1 shows one example of a test piece used in the present invention.

Referring to the drawings, there is shown in FIG. 1 one example of a test piece 1 which is exposed under certain conditions and is processed in a standard developing solution, having a continuous tone zone 2 and a halftone dot zone 3. The density is measured at light and shade points 4 and 5 having halftone dot area rates of 90% and 10% of the halftone dot zone 3 by a densitometer 6 to obtain first and second standard densities $N_4$ and $N_5$, respectively. Another test piece 1 of the same type as the above described test piece 1 is processed in a developing solution to be controlled, and the densities at the corresponding points as the above test piece 1 are measured in the same manner to obtain densities $N_4'$ and $N_5'$.

Then, according to the present invention, the activity of the developing solution to be controlled is controlled by a computer or a processor, such as automatically adding a supplementary oxidation compensating solution to the developing solution to be controlled according to the following formula in order to restore the developing activity:

$$T=K_1[K_3(N_4-N_4')-(N_5-N_5')]+K_2$$

In this formula, T is the operating time of constant-flow supplementing means which adds the supplementary solution to the developing solution to be controlled, and $K_1$, $K_2$ and $K_3$ are first, second and third oxidation factors, respectively, which are predetermined depending on the test piece used, the developing solution to be controlled, the supplementary solution, measuring positions of the test piece, the flow speed of the constant-flow supplementing means, and so forth. The measuring points are determined in the continuous tone zone 2 at the corresponding positions to those of the halftone dot zone 3.

Figure 2:
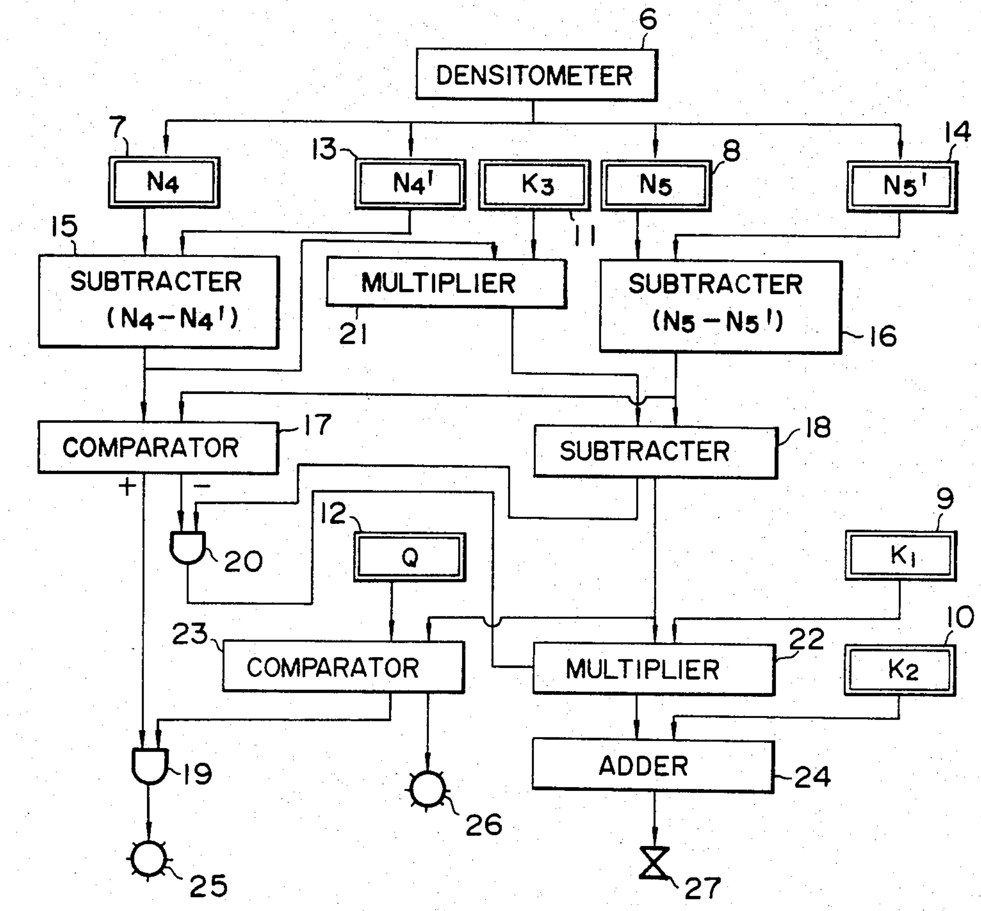
FIG. 2 is a block diagram of one embodiment of an apparatus according to the present invention.

In FIG. 2 there is shown one embodiment of an apparatus according to the present invention.

The first and the second standard densities $N_4$ and $N_5$ measured by the densitometer 6, and the first, the second and the third oxidation factors $K_1$, $K_2$ and $K_3$ are set in a first and second standard density setup means 7 and 8 and the first, the second and the third oxidation factor setup means 9, 10 and 11, in advance.

A permissible range Q in which no activity control of the developing solution to be controlled is performed since the difference between the activities of the standard developing solution and the developing solution to be controlled is small enough, is set in permissible density range setup means 12 in advance.

The first and the second measured densities $N_4'$ and $N_5'$ measured by the densitometer 6 are set in the first and the second measured density setup means 13 and 14, respectively. The first standard and measured densities $N_4$ and $N_4'$ are sent to a first subtracter 15, and the second standard and measured densities $N_5$ and $N_5'$ are fed to a second subtracter 16. The first and the second subtracters 15 and 16 calculate the density differences $N_4-N_4'$ and $N_5-N_5'$, respectively.

The density difference $N_4-N_4'$ is sent to a density comparator 17 and a first multiplier 21, and the density difference $N_5-N_5'$ is sent to the density comparator 17 and a third subtracter 18.

The density comparator 17 discriminates the magnitude of the two density differences $N_4-N_4'$ and $N_5-N_5'$, i.e. too sufficient or insufficient developing activity of the developing solution to be controlled, and outputs a positive or negative signal to the first gate 19 or the second gate 20.

The first multiplier 21 receives the density difference $N_4-N_4'$ and the third oxidation factor $K_3$ from the first subtracter 15 and the third oxidation factor setup means 11, respectively, and calculates $K_3(N_4-N_4')$ which is to be sent to the third subtracter 18.

The third subtracter 18 calculates $K_3(N_4-N_4')-(N_5-N_5')$ and sends this subtraction result to the second gate 20 and a second multiplier 22. The second gate 20 is opened by the output signal of the third subtracter 18 only when the density comparator 17 outputs the negative signal, that is, a supplementary solution is to be added to the developing solution to be controlled.

The second multiplier 22 is driven by the output signal of the second gate 20, receives the subtraction result of the third subtracter 18 and the first oxidation factor $K_1$ set in the first oxidation factor setup means 9, and calculates $K_1[K_3(N_4-N_4')-(N_5-N_5')]$ which is fed to an adder 24.

A range comparator 23 receives the subtraction result of the third subtracter 18 and the permissible density range Q set in the permissible density range setup means 12, and compares the former with the latter. When the subtraction result of the third subtracter 18 is smaller than the permissible density range Q, the range comparator 23 outputs a negative signal to a lamp 26 and illuminates it in order to caution the supplement of the supplementary solution. When the subtraction result of the third subtracter 18 is larger than the permissible density range Q, the range comparator 23 outputs a positive signal to the first gate 19 and opens the first gate 19. Then, the first gate 19 outputs a signal to a lamp 25 and illuminates it so as to inform the too sufficient developing activity of the developing solution.

The adder 24 receives the calculation result of the second multiplier 22 and the second oxidation factor $K_2$ set in the second oxidation factor setup means 10, and calculates an operating time $T=K_1[K_3(N_4-N_4')-(N_5-N_5')]+K_2$. Then, a constant-flow solenoid valve 27 is opened for the operating time T by the output of the adder 24 in order to add the desired amount of the supplementary solution to the developing solution to be controlled, thereby restoring the activity of the developing solution to the predetermined value.

In this embodiment, the constant-flow solenoid valve 27 may be adapted to be opened only when the range comparator 23 outputs the negative signal to the constant-flow solenoid valve 27, that is, the subtraction result of the third subtracter 18 is smaller than the permissible density range Q.

It is readily understood that according to the present invention, the control of the activity of the developing solution against the oxidation can be performed mechanically and quickly without need of any skill, which is much advantage and improves the rate of operation very much.

In this embodiment, at an exit of a dryer of an automatic developer, a test piece detector such as a microswitch, temporary stop means for a film transfer, which is actuated by the test piece detector, and a densitometer 6 may be disposed, thereby measuring the density of the test piece automatically. Thus the measured density is input to the apparatus of the present invention. Alternatively, the density of the test piece developed is measured manually at a proper position, and the measured density may be input to the apparatus of the present invention.

Figure 3:
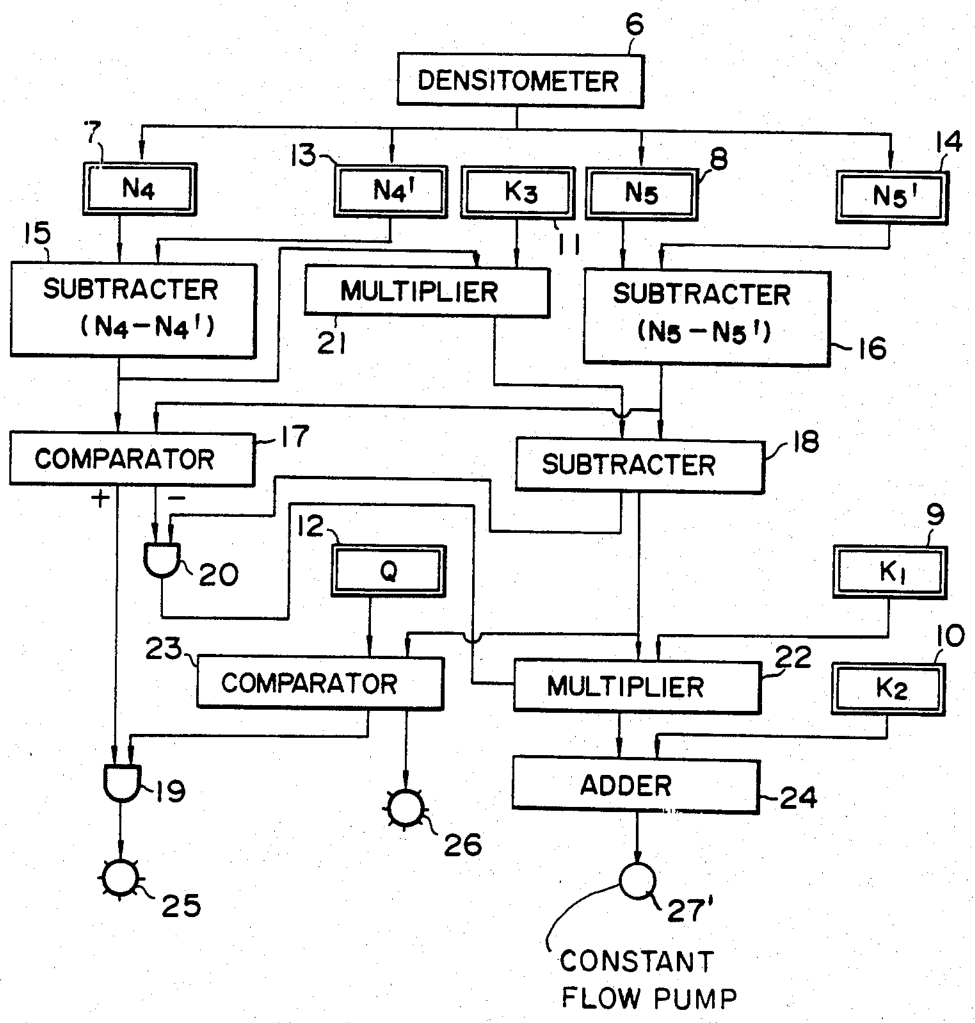
FIG. 3 is a block diagram of a modification of the apparatus of FIG. 2.

In this case, a constant-flow pump 27' as in FIG. 3, or other proper constant-flow supplementing means can be used instead of the constant-flow solenoid valve 27.

Although the present invention has been described in some detail by way of illustration and example for purposes of clarity of understanding, it will, of course, be understood that various changes and modifications thereof may be made in the form, details, and arrangements of the parts without departing from the scope of the present invention.

What is claimed is:

1. A method for controlling the activity of a developing solution against oxidation by using a test piece, for use in an automatic developer, comprising the steps of:

(a) obtaining differences $N_4-N_4'$ and $N_5-N_5'$ between first and second standard densities $N_4$ and $N_5$ measured at predetermined first and second points of a first test piece which has been developed in a standard developing solution, and densities $N_4'$ and $N_5'$ measured at points of a second test piece of the same type as the first test piece and which corresponds to said predetermined points of the first test piece, said second test piece having been developed in a developing solution to be controlled;

(b) calculating an operating time T of constant-flow supplementing means which supplements a supplementary solution to the developing solution to be controlled, according to a formula $T=K_1[K_3(N_4-N_4')-(N_5-N_5')]+K_2$ wherein $K_1$, $K_2$ and $K_3$ are first, the second and third predetermined factors dependent on the test pieces and developing solutions; and (c) actuating the constant-flow supplementing means for thus the obtained operating time T, thereby supplementing the supplementary solution to the developing solution to be controlled in order to restore its activity.

2. A method as defined in claim 1, wherein, when the value of $K_1[K_3(N_4-N_4')-(N_5-N_5')]$ is in a certain range, the constant-flow supplementing means is not actuated so as not to supplement the supplementary solution to the developing solution to be controlled.

3. An apparatus for controlling activity of developing solution against oxidation by using a test piece for use in an automatic developer, comprising:

(a) first and second standard density setup means for setting standard densities $N_4$ and $N_5$ at first and second points of a first test piece developed in a standard developing solution;

(b) first and second measured density setup means for setting measured densities $N_4'$ and $N_5'$ at points of a second test piece of the same type as the first test piece and which corresponds to said first and second points of the first test piece, which is developed in a developing solution to be controlled;

(c) first, second and third factor setup means for setting first, second and third factors $K_1$, $K_2$ and $K_3$, respectively, satisfying a formula $T=K_1[K_3(N_4-N_4')-(N_5-N_5')]+K_2$ wherein $K_1$, $K_2$ and $K_3$ are predetermined values and T is an operating time of constant-flow supplementing means for adding a supplementary solution to the developing solution to be controlled in order to adjust the activity thereof to a predetermined value;

(d) a first subtracter connected to receive the densities $N_4$ and $N_4'$ from the first standard density setup means and the first measured density setup means and calculate a density difference $N_4-N_4'$;

(e) a second subtracter connected to receive the densities $N_5$ and $N_5'$ from the second standard density setup means and the second measured density setup means and calculate a density difference $N_5-N_5'$;

(f) a density comparator connected to compare the two density differences $N_4-N_4'$ and $N_5-N_5'$ sent from the first and the second subtracters to discriminate the magnitude and output a positive or negative signal depending on the magnitude;

(g) a first multiplier connected to compare the two density differences $N_4-N_4'$ of the first subtracter and the third oxidation factor $K_3$ set in the third factor setup means and calculate $K_3(N_4-N_4')$;

(h) a third subtracter connected to receive the density difference $N_5-N_5'$ of the second subtracter and the calculation result $K_3(N_4-N_4')$ of the first multiplier and calculate $K_3(N_4-N_4')-(N_5-N_5')$;

(i) a second gate which opens only when it receives the negative signals from the density comparator and the first multiplier;

(j) a second multiplier driven by the signal output from the second gate and connected to receive the calculation result $K_3(N_4-N_4')-(N_5-N_5')$ of the third subtracter and the first oxidation factor $K_1$ set up in the first factor setup means and calculate $K_1[K_3(N_4-N_4')-(N_5-N_5')]$;

(k) an adder connected to receive the calculation result $K_1[K_3(N_4-N_4')-(N_5-N_5')]$ of the second multiplier and the second oxidation factor $K_2$ set in the second factor setup means and calculate the operating time $T=K_1[K_3(N_4-N_4')-(N_5-N_5')]+K_2$; and (m) constant-flow supplementing means for adding the supplementary solution to the developing solution to be controlled for the operating time T according to the output of the adder.

4. An apparatus as defined in claim 3, further comprising:

(n) density range setup means for setting permissible density range Q for the calculation result $K_3(N_4-N_4')-(N_5-N_5')$ of the third subtracter;

(o) a range comparator connected to receive the permissible density range Q set in the density range setup means and the calculation result $K_3(N_4-N_4')-(N_5-N_5')$ of the third subtracter, and compare the latter with the former, and output a positive or negative signal when the latter is larger or smaller than the former; and (p) a first gate connected to open only when it receives the positive signals from the density comparator and the range comparator.

5. An apparatus as defined in claim 4, wherein the range comparator outputs the negative signal to the constant-flow supplementing means so that the constant-flow supplementing means may be opened only when it receives the negative signal of the range comparator.

6. An apparatus as defined in claims 3, 4 or 5, wherein the constant-flow supplementing means is a constant-flow solenoid valve.

7. An apparatus as defined in claims 3, 4 or 5, wherein the constant-flow supplementing means is a constant-flow pump.

* * * * *